(12) United States Patent
Tomohiro

(10) Patent No.: US 9,191,534 B2
(45) Date of Patent: Nov. 17, 2015

(54) FILM HOLDER, METHOD FOR GENERATING READ IMAGE, AND SCAN SYSTEM

(71) Applicant: SEIKO EPSON CORPORATION, Tokyo (JP)

(72) Inventor: Junji Tomohiro, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/484,734

(22) Filed: Sep. 12, 2014

(65) Prior Publication Data

US 2015/0109644 A1  Apr. 23, 2015

(30) Foreign Application Priority Data

Oct. 18, 2013  (JP) ................. 2013-217791

(51) Int. Cl.
| H04N 1/04 | (2006.01) |
| H04N 1/00 | (2006.01) |
| G03B 1/48 | (2006.01) |
| G03B 27/50 | (2006.01) |
| G03B 27/62 | (2006.01) |

(52) U.S. Cl.
CPC .............. *H04N 1/00663* (2013.01); *G03B 1/48* (2013.01); *G03B 27/50* (2013.01); *G03B 27/62* (2013.01); *H04N 1/0066* (2013.01); *H04N 1/00551* (2013.01); *H04N 1/00665* (2013.01)

(58) Field of Classification Search
CPC ..... H04N 5/225; H04N 1/1017; H04N 1/028; H04N 5/23293; H04N 1/02409; H04N 1/02805; H04N 1/04; H04N 1/19589; H04N 1/0057; H04N 1/10; H04N 1/103; H04N 2201/0404
See application file for complete search history.

(56) References Cited

U.S. PATENT DOCUMENTS

| 5,448,324 | A | * | 9/1995 | Okano et al. ................. 396/518 |
| 5,790,187 | A | * | 8/1998 | Suzuki ............................ 348/96 |
| 6,079,832 | A | * | 6/2000 | McIntyre et al. ............... 353/30 |
| 6,157,440 | A | * | 12/2000 | Ikeda ............................. 355/75 |
| 6,271,912 | B1 | * | 8/2001 | Kurosawa et al. .............. 355/75 |
| 6,324,346 | B1 | * | 11/2001 | Miyadera ...................... 396/429 |
| 6,404,515 | B1 | * | 6/2002 | Onda et al. .................... 358/474 |
| 6,714,324 | B1 | * | 3/2004 | Kurosawa et al. ............ 358/487 |
| 6,825,957 | B1 | * | 11/2004 | Kurosawa ..................... 358/487 |
| 6,862,119 | B1 | * | 3/2005 | Yamamoto .................... 358/487 |
| 7,852,525 | B2 | * | 12/2010 | Nogami et al. ................ 358/497 |
| 7,880,939 | B2 | * | 2/2011 | Kam ............................. 358/474 |
| 7,894,105 | B2 | * | 2/2011 | Amimoto ...................... 358/474 |

(Continued)

FOREIGN PATENT DOCUMENTS

| JP | 2006-064714 A | 3/2006 |
| JP | 2006-166335 A | 6/2006 |

(Continued)

*Primary Examiner* — Negussie Worku
(74) *Attorney, Agent, or Firm* — Global IP Counselors, LLP

(57) ABSTRACT

A film holder includes a holder main body, a cover, and a positioning part. The holder main body has a transmission part configured to allow light to transmit through. The cover has a window that is arranged on a side opposite to the transmission part relative to a film in a state where the film is nipped between the cover and the holder main body. The positioning part is configured to be positioned relative to a scanner such that, in the state where the film is nipped between the holder main body and the cover, the transmission part is located on a side of a light source of the scanner and the window is located on a side of an imaging unit of the scanner.

8 Claims, 10 Drawing Sheets

(56) References Cited

U.S. PATENT DOCUMENTS

| | | | |
|---|---|---|---|
| 8,773,730 B2* | 7/2014 | Gu et al. | 358/474 |
| 2001/0012136 A1* | 8/2001 | Kurosawa | 358/487 |
| 2002/0130212 A1* | 9/2002 | Yamasaki | 242/532 |
| 2003/0189735 A1* | 10/2003 | Kurosawa | 358/474 |
| 2008/0043216 A1* | 2/2008 | Zhu | 355/72 |
| 2010/0157259 A1* | 6/2010 | Huang et al. | 355/30 |
| 2011/0317226 A1* | 12/2011 | Gu et al. | 358/474 |
| 2011/0317229 A1* | 12/2011 | Tang et al. | 358/498 |

FOREIGN PATENT DOCUMENTS

| | | |
|---|---|---|
| JP | 4333681 B2 | 9/2009 |
| JP | 4655546 B2 | 3/2011 |

* cited by examiner

FILM HOLDER, METHOD FOR GENERATING READ IMAGE, AND SCAN SYSTEM

CROSS-REFERENCE TO RELATED APPLICATIONS

This application claims priority to Japanese Patent Application No. 2013-217791 filed on Oct. 18, 2013. The entire disclosure of Japanese Patent Application No. 2013-217791 is hereby incorporated herein by reference.

BACKGROUND

1. Technical Field

The present invention relates to a film holder, a method for generating a read image, and a scan system.

2. Related Art

A read apparatus (scanner) for reading a transparent original (hereinafter, "film") such as a photographic film has been known. The film is read by the scanner in a state of being held by a film holder. Regarding such a feature, there is a known film holder that is provided with a holding part for holding two end parts of the film so that a middle part of the film curves convexly, and a transmission part for pressing against the convexly curved film from the convex direction to position the film (see Japanese Patent No. 4655546).

In Japanese Patent No. 4655546, the film holder is inserted into the scanner while still in a posture where the transmission part supports the film from below in a state in which the two end parts of the film, having been placed on the transmission part (a transparent plate), are held by the holding part (nipped between a base and a cover). Thus, a light source installed below the film holder irradiates with light, and a transmitted light image is formed on a light-receiving surface of an image sensor installed above the film holder.

However, problems such as the following emerge in a case where a film holder is placed onto a flat bed scanner in a posture similar to the above-described posture. Namely, when the film holder is placed as described above on a platen, having a surface of transparent glass or plastic, of a flat bed scanner, then between the film and the image sensor installed inside the platen there ends up being the surface of transparent glass or plastic as well as the transmission part of the film holder. When the transmission part is present between the image sensor and the film that is the subject of reading, then light ends up being diffused by soiling of the front surface of the transmission part or the like, and the image that is formed on the light-receiving surface of the image sensor ends up being blurred.

SUMMARY

The present invention has been made in order to solve at least the above-described problems, and provides a film holder, a method for generating a read image, and a scan system that are adapted to reading films.

In one aspect of the invention, a film holder comprises a holder main body including a transmission part, a cover, and a positioned part. The transmission part is configured to allow light to transmit through. The cover has a window that is arranged on a side opposite to the transmission part relative to a film in a state where the film is nipped between the cover and the holder main body. The positioning part is configured to be positioned relative to a scanner such that, in the state where the film is nipped between the holder main body and the cover, the transmission part is located on a side of a light source of the scanner and the window is located on a side of an imaging unit of the scanner.

According to such a configuration, when in the state where the film is nipped between the holder main body and the cover, then the film holder positions relative to the scanner so that the transmission part is located on the light source side of the scanner and the window is located on the imaging unit side of the scanner. Therefore, an event where the transmission part of the film holder is located between the film and the imaging unit (image sensor) of the scanner is reliably avoided, and an event where an image obtained by reading is blurry is avoided.

In one aspect of the invention, the film holder further comprises a regulating part configured to come into contact with a platen that accommodates the imaging unit of the scanner and regulate a distance between the platen and the holder main body. The regulating part is arranged in a range where a frame part of a periphery of the transmission part in the holder main body and a frame part of a periphery of the window in the cover overlap with one another.

According to such a configuration, the regulating part is formed in the range where the frame part of the periphery of the transmission part in the holder main body and the frame part of the periphery of the window in the cover overlap with one another. In other words, the regulating part is provided to the closest possible position to the film, and therefore the position of the film relative to the scanner is stabilized, and an image obtained by reading is also stabilized.

The regulating part is formed on one of either the holder main body or the cover.

In a case where the regulating part is formed on the holder main body, then the cover further has a through hole configured to pass the regulating part of the holder main body therethrough. This makes it possible for the regulating part to reliably come into contact with the platen.

The through hole may be formed integrally with the window. According to such a configuration, less time and effort is needed for the processing for forming the window and the through hole in the cover.

In one aspect of the invention, the regulating part is configured to move relative to the holder main body to keep the distance between the platen and the holder main body to one distance out of different distances.

According to such a configuration, the user is able to easily adjust the distance between the platen and the holder main body.

The cover may be smaller than the holder main body.

According to such a configuration, the operation for nipping the film, having been placed on the holder main body, between the holder main body and the cover is very comfortable.

A method for generating a read image of a film by scanning the film using a film holder having such features as are described above could also be considered one invention. The method comprises placing the film such that the film is nipped between the holder main body and the cover, positioning the film holder, with which the film is nipped, relative to the scanner by using the positioning part such that the transmission part is located on the side of the light source of the scanner and the window is located on the side of the imaging unit of the scanner, and generating the read image by irradiating the film with light using the light source and reading the film by receiving the light that has passed through the film using the imaging unit.

A scan system provided with a film holder having such features as are described above and a scanner for reading the film could also be considered one invention. The scan system comprises a film holder configured to hold a film, and a scanner configured to read the film. The film holder includes a holder main body having a transmission part configured to allow light transmit through, a cover having a window that is arranged on a side opposite to the transmission part relative to the film in a state where the film is nipped between the cover and the holder main body, and a positioning part configured to be positioned relative to the scanner such that, in the state where the film is nipped between the holder main body and the cover, the transmission part is located on a side of a light source of the scanner and the window is located on a side of an imaging unit of the scanner.

BRIEF DESCRIPTION OF THE DRAWINGS

Referring now to the attached drawings which form a part of this original disclosure:

FIG. 6 is a cross-sectional view of a regulating part and the like;

DETAILED DESCRIPTION OF EXEMPLARY EMBODIMENTS

An embodiment of the present invention shall be described below, with reference to the accompanying drawings.

Figure 1A:
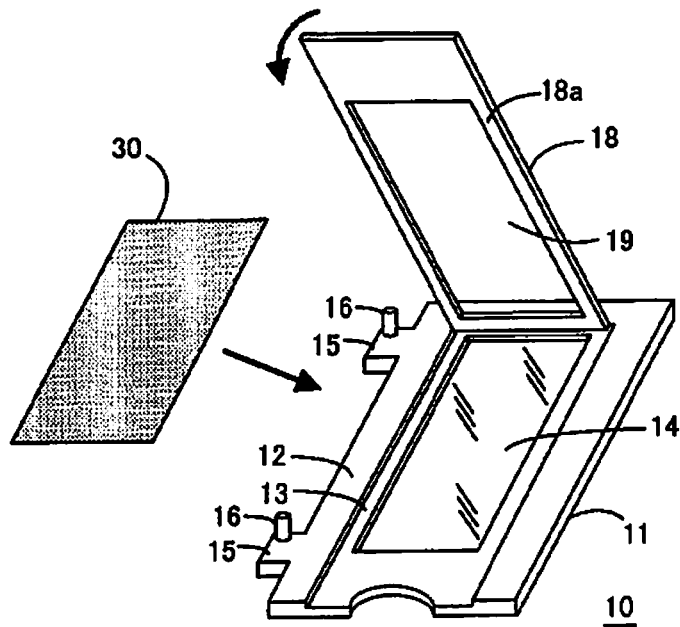
FIGS. 1A, 1B, and 1C illustrate perspective views illustratively exemplifying a method of using a film holder.
Figure 1B:
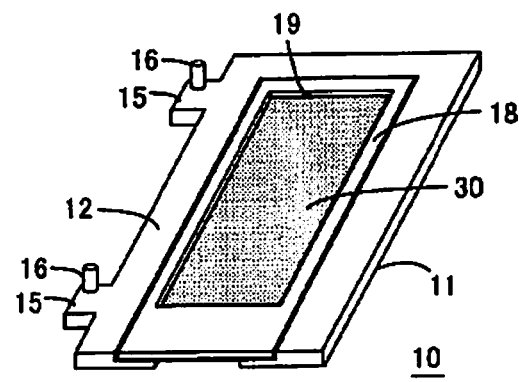
Figure 1C:
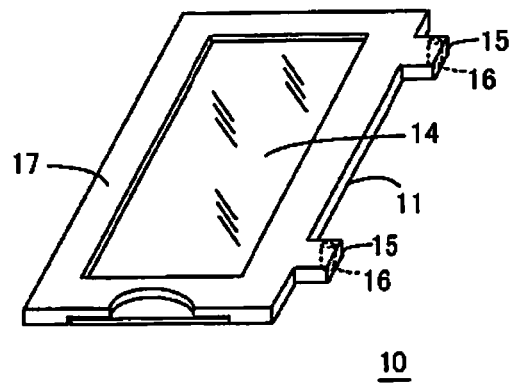

FIGS. 1A, 1B, and 1C illustrate perspective views illustrating a method of using a film holder 10 as in the present embodiment. The film holder 10 comprises a substantially rectangular holder main body 11 and a substantially rectangular cover 18. The outer peripheral shape of the cover 18 is smaller than the outer peripheral shape of the holder main body 11. The holder main body 11 and the cover 18 are formed of plastic or the like. The holder main body 11 comprises a base body where a middle part has been hollowed out in a substantially rectangular shape, and a planar transmission part 14 that is held in the range where the base body has been hollowed out. The transmission part 14 is able to allow light to transmit through and is formed of glass, plastic or the like. A surface of the transmission part 14 is made to be a diffusion surface.

The holder main body 11 has, on one surface 12, a frame-shaped recess 13 that is recessed relative to the surface 12 at the periphery of the transmission part 14. The cover 18 is a frame where the middle part is hollowed out in a substantially rectangular shape and has nothing provided. This range of the cover 18 that has been hollowed out is called a window 19.

The cover 18 has one short side that is coupled by hinges 25 (see FIGS. 5 and 7) or the like to the holder main body 11, and can be opened and closed with respect to the holder main body 11 with this short side serving as the axis. FIG. 1A illustrates a state where the cover 18 has been opened, and FIG. 1B illustrates a state where the cover 18 has been closed. When closed, the cover 18 is accommodated in the recess 13 of the holder main body 11.

The film 30, which serves as the subject of reading by a scanner, is placed onto the transmission part 14 from the surface 12 side in a state where the holder main body 11 has been placed onto a desk or the like and the cover 18 is open (FIG. 1A). At this time, the film 30 is placed so that the front surface faces upward (the cover 18 side) and the reverse surface faces downward (the transmission part 14 side). Next, the cover 18 is closed, and this causes the edges of the film 30 to be nipped between the recess 13 and a surface 18a of the cover 18 that opposes the recess 13, thus causing the film 30 to be held in the film holder 10 (FIG. 1B). This causes the window 19 to be positioned on the opposite side of the transmission part 14, with the film 30 therebetween. In other words, one surface (the reverse surface) of the film is in contact with the transmission part 14, and the other surface (the front surface) of the film 30 is exposed to the exterior via the window 19. The portion where the film 30 is nipped may also be called a film end holding part. FIGS. 1A and 1B could also be said to illustrate the "film placement step," as could the description relating to FIGS. 1A and 1B.

When the cover 18 is closed, the cover 18 is locked to the holder main body 11. The specific configuration for this locking is not particularly limited. For example, a protrusion or stop is formed in one out of either the cover 18 or the recess 13 and a recess for receiving this protrusion or stop is formed in the other, and the cover 18 is locked with the holder main body 11 by engagement of the protrusion or claw and the recess with one another.

Next, in a state where the film 30 is being held, the film holder 10 is reversed. This enacts a state where the surface 12, which faced upward in the film placement step, now faces downward, and a surface 17 of the holder main body 11, which is the opposite side of the surface 12, faces upward (FIG. 1C). The holder main body 11 has extending parts 15 that extend a part of the edge thereof, and the extending parts 15 have cylindrical protrusions 16 that project out from the surface 12, respectively. The extending parts 15 and the protrusions 16 are formed at two places on the edge of the holder main body 11. The protrusions 16 correspond to one example of the "positioning part."

Figure 2:
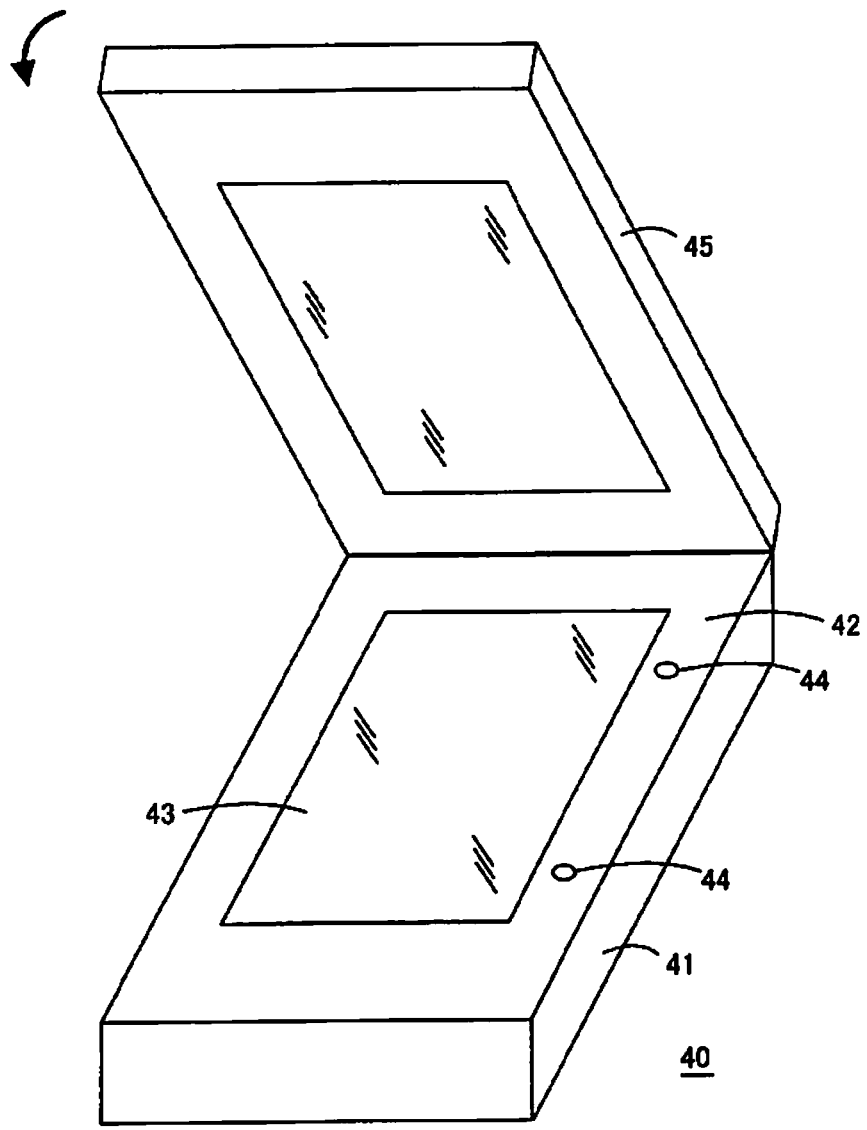
FIG. 2 is a perspective view illustratively exemplifying the outer appearance of a scanner.

FIG. 2 is a perspective view that has a simplified illustration of the outer appearance of a scanner 40. The scanner 40 is a so-called flatbed scanner. The scanner 40 comprises a main body part 41 and a lid part 45. The lid part 45 has one side that is coupled by hinges or the like (not shown) to the main body part 41, and can be opened and closed with respect to the main body part 41, with the one side serving as an axis. An upper surface of the main body part 41 is a platen 42, and the platen 42 has at a middle part a transparent surface of glass or plastic (for example, a platen glass 43). The main body part 41 accommodates an imaging unit in the interior. Moreover, the main body part 41 has positioning holes 44 formed at predetermined positions of the platen 42. Each of the holes 44 is a hole for the insertion of a respective protrusion 16 of the film holder 10, and the holes 44 are formed in accordance with the number, positions, and shape of the respective protrusions 16. The holes 44 may also be called a positioning part of the scanner 40 side. A lower surface of the lid part 45 (a surface opposing the platen 42) has at a middle part a transparent surface of glass or plastic. The lid part 45 accommodates a light source in the interior.

Figure 3:
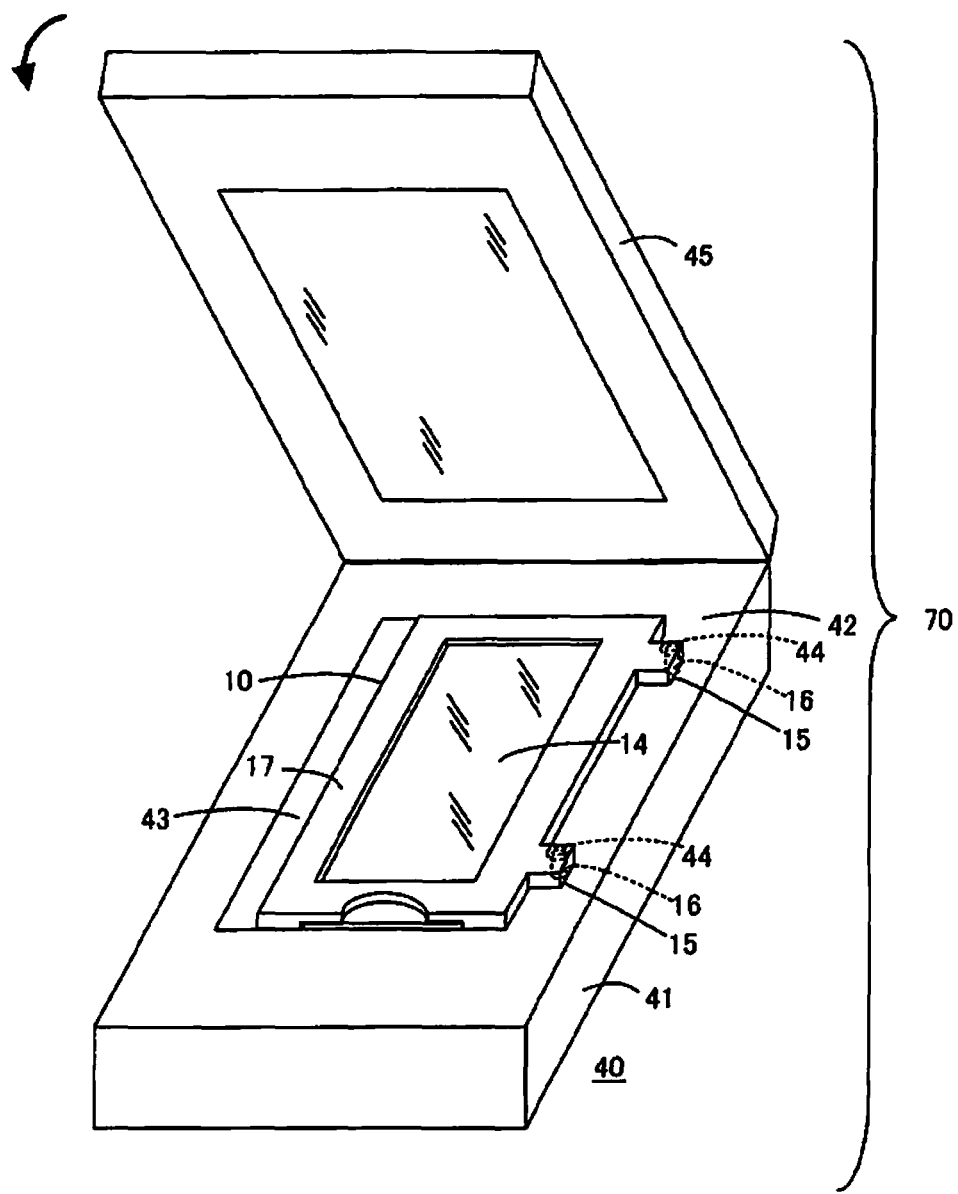
FIG. 3 is a perspective view illustratively exemplifying a state where the film holder has been installed onto the scanner.

In the configuration of such description, as illustrated in FIG. 3, the film holder 10 in the posture in FIG. 1C is placed onto the platen 42 (the platen glass 43). At this time, each of the protrusions 16 of the film holder 10 is inserted into each of the holes 44 of the platen 42, and the film holder 10 is thereby positioned with respect to the scanner 40. That is to say, in the state where the film 30 is nipped between the holder main body 11 and the cover 18, the film holder 10 is positioned with respect to the scanner 40 by the function of the positioning parts so that the transmission part 14 is located on the light source side and the window 19 is located on the imaging unit side.

FIG. 3 could be said to illustrate a "film holder positioning step," as could the description relating to FIG. 3. After the film holder 10 has been installed as in FIG. 3, then the lid part 45 of the scanner 40 is closed, and reading of the film 30 by the scanner 40 is commenced. A configuration comprising the film holder 10 and the scanner 40 may be called a scan system 70.

Figure 4:
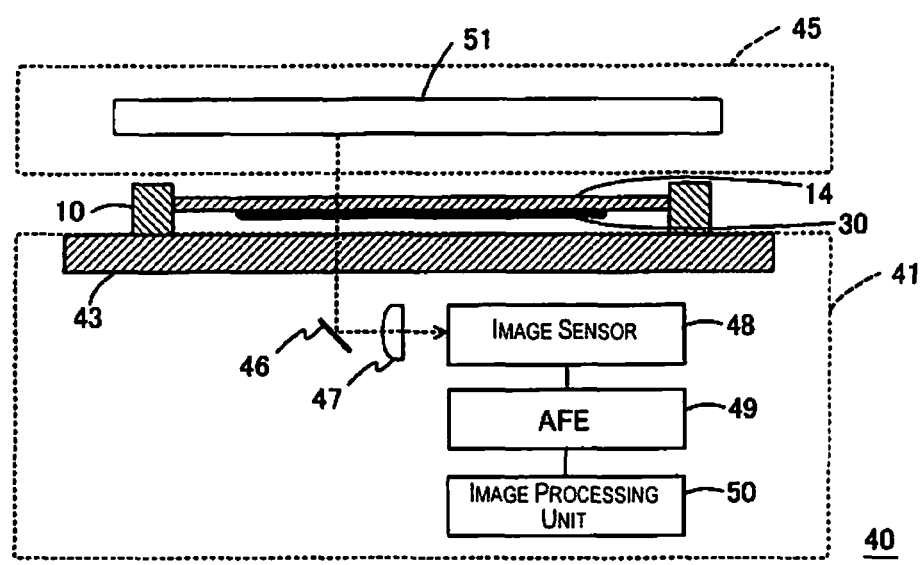
FIG. 4 is a block diagram illustratively exemplifying the configuration of the scanner.

FIG. 4 is a block diagram illustratively exemplifying, in a simplified manner, the configuration of the scanner 40 in the state where the lid part 45 has been closed. FIG. 4 likewise illustratively exemplifies, in a simplified manner, a state where the film holder 10 holding the film 30 as described above has been placed on the platen glass 43. The lid part 45 has a light source 51 in the interior, as stated above. The main body part 41, in turn, has in the interior a mirror 46, a lens 47, an image sensor 48, an analog front end (AFE) 49, an image processing unit 50, and the like. The light source 51, the mirror 46, and the lens 47 are an optical system for forming a transmitted light image of the film 30 held by the film holder 10 onto a light-receiving surface of the image sensor 48.

When the light source 51 emits light, then the light emitted by the light source 51 scatters upon being transmitted through the transmission part 14, and the film 30 is irradiated therewith. The transmitted light of the film 30 passes through the window 19 (not shown in FIG. 4), and arrives at the light-receiving surface of the image sensor 48 (imaging unit) by way of the mirror 46 and the lens 47.

The image sensor 48 is provided with photoelectric conversion elements, and is constituted of a CCD linear image sensor, a CMOS linear image sensor, or the like. The image sensor 48 subjects the light received at the light-receiving surface to a photoelectric conversion at each of the photoelectric conversion elements, and outputs an electrical signal corresponding to the tint or shade of the image on a scan line. That is to say, the film 30 is read by the image sensor 48 (a reading step). The AFE 49 carries out processes such as noise removal, amplification, A/D conversion, or the like by correlated double sampling (CDS) on the electrical signals outputted from the image sensor 48. The image processing unit 50 is an ASIC having functions such as gamma correction, sharpening processing, moiré removal processing, shading correction, interpolation of defective pixels, correction of white balance, and the like, and carries out each of the processes according to these functions on the digital signals (image signals) outputted from the AFE 49. The digital signals (image data) outputted from the AFE 49 and digital signals (image data) outputted from the image processing unit 50, which have been generated in this manner, are image data for a read image of the film. The scanner 40 is able to store the image data thus generated in a storage medium (not shown) that has been set up in the scanner 40, or transmit the image data to an external apparatus such as a personal computer via a communication interface (not shown).

In this manner, according to the present embodiment, the film holder 10 is inverted from the state (FIG. 1B) where the film 30 that has been placed on the transmission part 14 of the holder main body 11 is nipped between the holder main body 11 and the cover 18, and is then installed (FIG. 3) on the platen 42 of the flatbed scanner (scanner 40) while still in this inverted posture (FIG. 1C). Therefore, the transmission part 14 is located on the light source side, which is above in the structure of the flatbed scanner, and the window 19 is located on the imaging unit side, which is below. As a result, an event where the transmission part 14 of the film holder 10 is located between the film 30 and the imaging unit is reliably avoided, and an event where the image data obtained in reading of the film 30 by the imaging unit is blurred is avoided. In other words, the present embodiment exhibits the effect of enhancing the image quality obtained by reading the film 30.

Inverting the film holder 10 as described above also produces the following effects. In a case where the film holder 10 is placed on the plate 42 without having been inverted (in a state where the window 19 faces upward and the transmission part 14 faces downward), then processing for inverting the left/right orientation of the image is needed because the image read by the imaging unit will be an image where left and right are reverse (a mirror image) compared to a case where a reflective original is being read. Such inversion processing is the responsibility of the PC software side, such as the scanner 40 or a scanner driver, and requires a certain period of time. In the present embodiment, the film holder 10 is inverted, as stated above, and therefore the image that is read by the imaging unit will be an image of left/right orientation similar to a case where a reflective original is being read. Therefore, the need for the above-described inversion processing to be executed by the scanner 40, scanner driver, or other such PC software is obviated, and the processing load on the scanner 40, scanner driver, or other such PC software is reduced.

In the present embodiment, downwardly orienting the surface 12 of the film holder 10 and upwardly orienting the surface 17 (inverting the film holder 10) causes each of the protrusions 16 of the film holder 10 to be matched to the positions of each of the holes 44 of the platen 42. Were the film holder 10 not to be inverted, each of the protrusions 16 would come up against the lid part 45, and it would not be possible to properly close the lid part 45. In other words, the user cannot correctly install the film holder 10 on the scanner 40 when the film holder 10 is not inverted, and therefore errors in the posture upon installation of the film holder 10 can be reliably eliminated.

The film holder 10 has the transmission part 14, as stated above. Therefore, when an attempt is made to nip the film 30 between the holder main body 11 and the cover 18, then the transmission part 14 and the surrounding holder main body 11 (the film end holding part) play the role of a floor, and the film 30 is prevented from falling down through. Curving of the film 30 is corrected by the transmission part 14, and the flatness of the film 30 is ensured. Therefore, blurring of the image caused by curving of the film 30 is avoided, and the image that is formed by the image sensor 48 will be sharp. The surface of the transmission part 14 serves as a diffusing surface for diffusing the light, as stated above. Therefore, in a case where a minute gap has been formed between the film 30 and the transmission part 14, then so-called Newton's rings can be prevented from occurring.

In order to enhance the degree of close contact of the film 30 with the transmission part 14 and further stabilize the flatness of the portion of the film 30 that is exposed from the window 19, the shape of the holding part (inclined surface) disclosed in Japanese Patent No. 4655546 may be employed for the film end holding part (the recess 13 of the holder main body 11, and the surface 18a of the cover 18 opposite to the recess 13). The edges of the film 30 are nipped by the film end holding part that has such an inclined surface, and this causes the film 30 to curve convexly to the transmission part 14 side and causes the convexly curved surface to be blocked by the transmission part 14. As a result, the film 30 is brought into close contact with the transmission part 14. Also, in the state where the edges are nipped by the film end holding part, then the film 30 maintains the posture of being pressed against the transmission part 14, as described above. Therefore, as stated above, even when the film holder 10 is inverted upon being placed on the scanner 40, an event where the film 30 being held by the film holder 10 hangs down from the window 19 below is avoided.

The film holder 10 may have a plurality of spaces (pairs of covers 18 and transmission parts 14) for nipping films 30, the spaces being arranged side by side in parallel so that a plurality of films 30 can be nipped at the same time. In the present embodiment, however, the film holder 10 is understood to have only one place that is a space for nipping the film 30 of such description. This configuration makes it easier to ensure the thickness of the portion for nipping the edges of the film 30 (cover 18 and recess 13) and makes it easier also to ensure the surface area of the holder main body 11 (the surface area of the portion not overlapping with the film 30). This enhances the rigidity of the film holder 10. Therefore, skewing of the film holder 10 upon being installed on the scanner 40 (skewing of the film 30) is curbed, the distance between the film 30 overall and the platen 42 is stabilized, and an effect of reading at high image quality is obtained. Moreover, in a case where there are a plurality of spaces for nipping the films 30 and the films 30 are not being nipped in some of the spaces, then there is a concern that light could enter in via the spaces in question and lower the quality of reading, but there is no such concern in the present embodiment.

In the present embodiment, the film holder 10 may be further provided with regulating parts 20. The regulating parts 20 refer to members that come into contact with the platen 42 (platen glass 43) and regulate the distance between the platen 42 and the holder main body 11 when the film holder 10 is placed on the platen 42 of the scanner 40. By moving relative to the holder main body 11, the regulating parts 20 are also able to keep the distance between the platen 42 and the holder main body 11 to one distance out of different distances. So doing makes it possible to keep the position of the film 30 at an optimal position (position where the image comes into focus) even though there might be variations in manufacturing. The film holder 10 has the regulating parts 20 at a range where a frame part of the periphery of the transmission part 14 in the holder main body 11 and a frame part of the periphery of the window 19 in the cover 18 are overlapped. The recess 13 falls under the frame part of the periphery of the transmission part 14 in the holder main body 11. Because the cover 18 has a frame shape, the frame part of the periphery of the window 19 in the cover 18 may be interpreted as referring to the cover 18 itself.

Because the regulating parts 20s are formed in the range where the frame part of the periphery of the transmission part 14 in the holder main body 11 and the frame part of the periphery of the window 19 in the cover 18 are overlapped, the regulating parts 20 may be formed on the holder main body 11 side or may be formed on the cover 18 side. An example where the regulating parts 20 are formed on the holder main body 11 side shall be described below, with reference to FIGS. 5 to 7.

Figure 5:
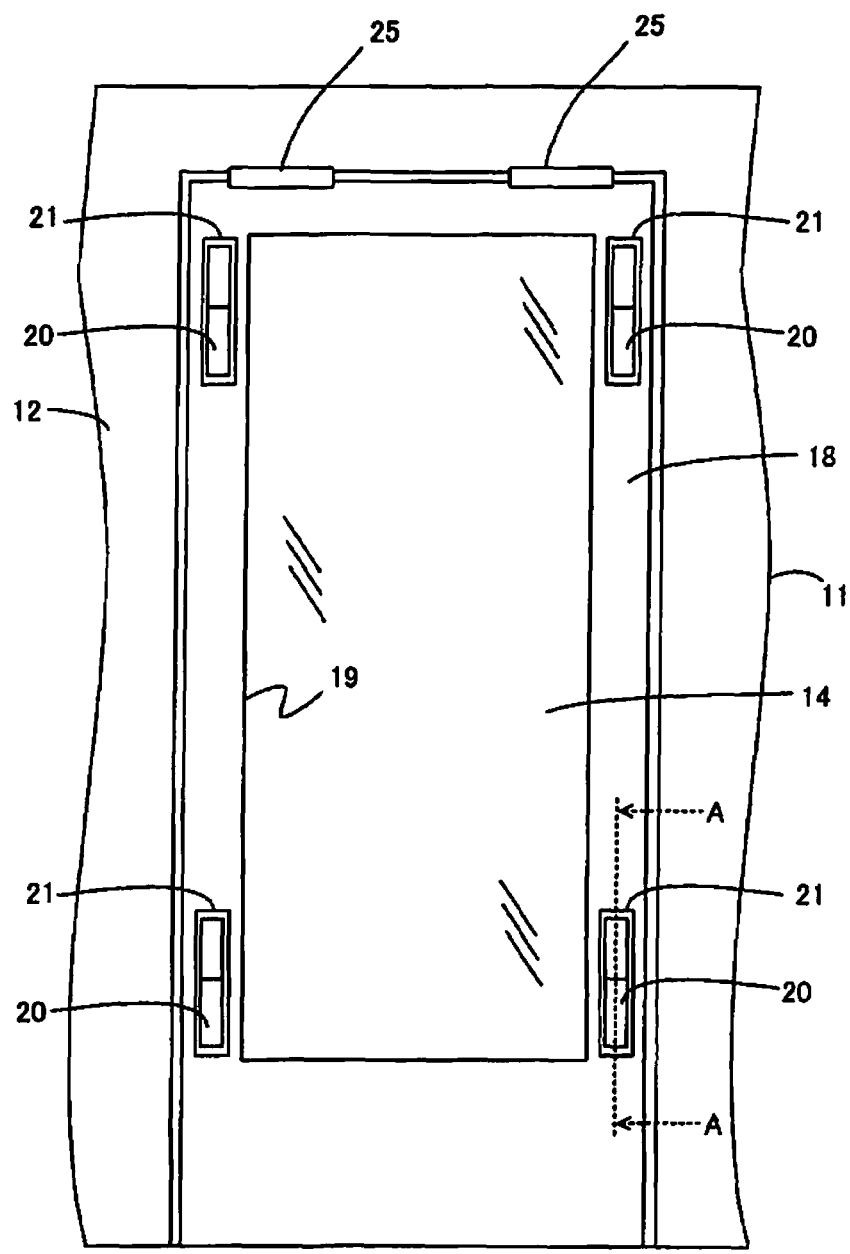
FIG. 5 is a plan view illustratively exemplifying a cover and one part of the holder main body.

FIG. 5 illustratively exemplifies the cover 18 and a part of the holder main body 11, from the surface 12 side of the holder main body 11. In FIG. 5, the cover 18 is closed. According to FIG. 5, the cover 18 has through holes 21 formed at a plurality of places (for example, four places). The through holes 21 are holes for passing the regulating parts 20 through. As illustrated in FIG. 5, the regulating parts 20 are provided to inside the through holes 21.

Figure 6:
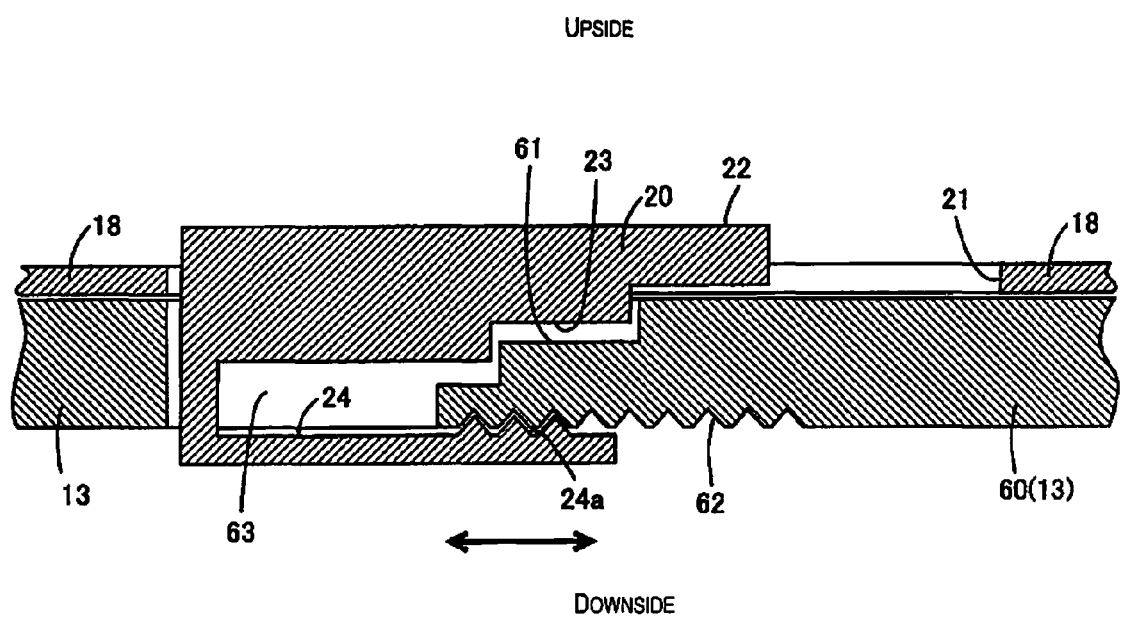

FIG. 6 illustrates a part of the cross-section taken along the A-A line in FIG. 5, and mainly illustratively exemplifies the cross-sections of the regulating parts 20 and the surrounding portions thereof. The configurations of each of the regulating parts 20 illustrated in FIG. 5 are all similar. The regulating part 20 is engaged with a fixed part 60. The fixed part 60 is a part of the recess 13, and is formed at a position facing a through hole 63 that perforates through the recess 13 in the thickness direction of the holder main body 11. The fixed part 60 has an upwardly facing surface 61 that is formed so as to have a staircase shape, and the thickness thereof decreases in a stepwise manner. Regarding the description of FIG. 6, any instance referring to "upward," "upper," or "upside" is referring to the surface 12 side out of the surface 12 and surface 17 of the holder main body 11, and any instance referring to "downward," "lower," or "downside" is referring to the surface 17. A surface 23 of the regulating part 20 corresponding to the surface 61 is formed in a staircase shape so as to substantially match the shape of the surface 61.

In the example in FIG. 6, the regulating part 20 is engaged with the fixed part 60 so as to nip the fixed part 60 between the surface 23 and surface 24 which faces the surface 23. The surface 24 has an engagement surface 24a where mountains and valleys (grooves) are alternately formed, in a partial range opposite to a lower surface of the fixed part 60. In the fixed part 60, too, there is an engagement surface 62 where mountains and valleys (grooves) are formed alternately, in a partial range of the lower surface. There is meshed engagement between the engagement surface 24a and the engagement surface 62. In the configuration of such description, the user is able to move the regulating part 20 along the direction of the arrows illustrated in FIG. 6. In association with this movement of the regulating part 20, the surface 23 thereof also goes up and down the surface 61, at which time the position of the uppermost surfaces 22 of the regulating part 20 changes up or down in a stepwise manner.

In order to achieve such movement, the regulating part 20 is formed of a material that has a certain degree of flexibility. As illustrated in FIG. 6, the regulating part 20 perforates through the through hole 63 and the through hole 21 that perforates through the cover 18 in the thickness direction, and the surface 22 is more upward than the through holes 21. The surface 22 is a surface that comes into contact with the platen 42 (the platen glass 43) when the film holder 10 has been inverted (FIG. 1C) and arranged on the platen 42 of the scanner 40 (FIG. 3).

That is to say, moving each of the regulating parts 20 in the above-described manner enables the user to adjust the height (distance) of the holder main body 11 from the platen 42, and so doing enables the user to position the film 30 to a distance that is optimal for the image sensor 48 to have sharpness in reading the film 30. A feature of the present embodiment is that the regulating parts 20 are formed in the range where the frame part of the periphery of the transmission part 14 in the holder main body 11 and the frame part of the periphery of the window 19 in the cover 18 are overlapped with respect to each other. That is to say, each of the regulating parts 20 is at a position closer to the film 30 than a case where the regulating parts 20 are formed further outward than such a range. Therefore, skewing of the periphery of the film 30 when the film holder 10 has been installed on the scanner 40 can be eliminated to the greatest extent possible, and the flatness of the overall portion where the film 30 is exposed from the window 19 can be upheld, as can the parallelism thereof relative to the platen glass 43.

Figure 7:
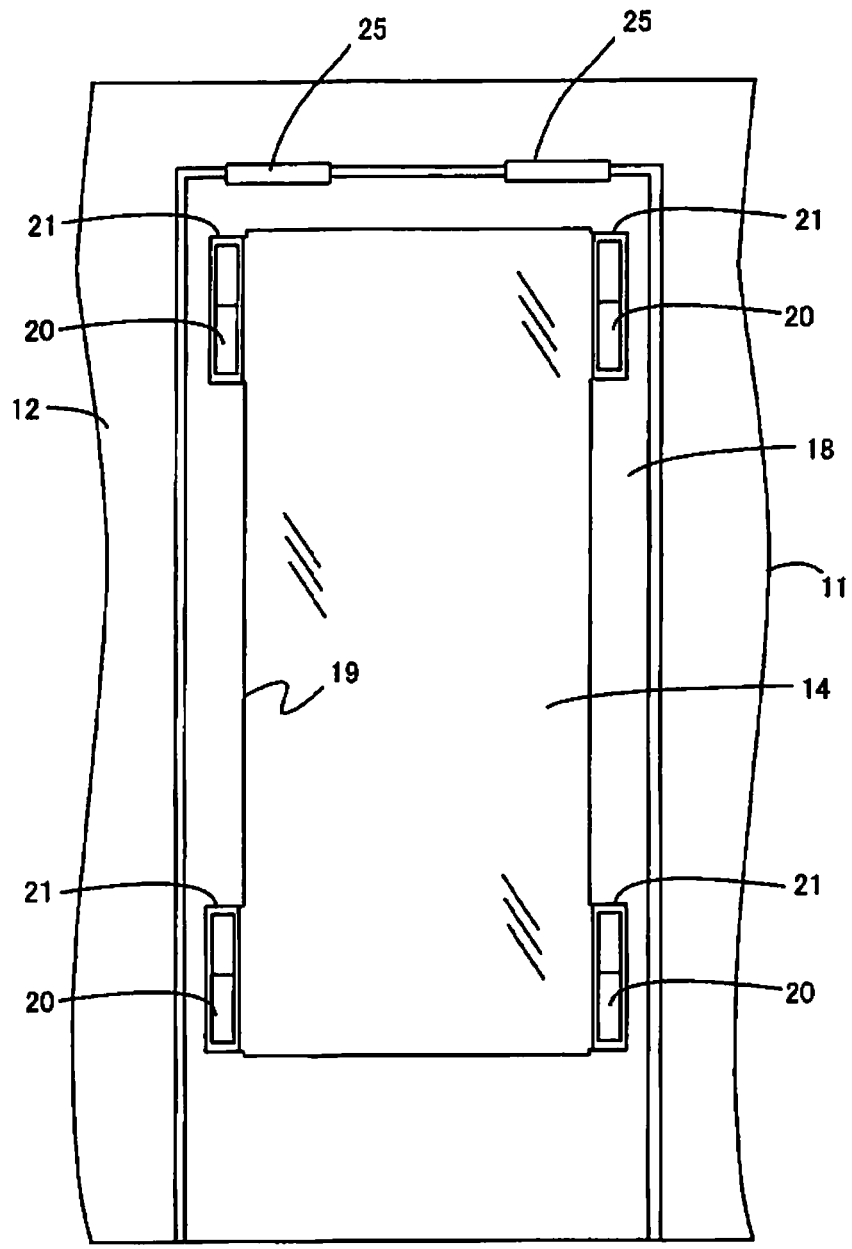
FIG. 7 is a plan view illustrating another example of a cover and one part of a holder main body.

FIG. 7 illustrates the cover 18 and one part of the holder main body 11 with a similar point of view to that of FIG. 5, and illustrates an example different from that of FIG. 5. In the example in FIG. 7, each of the through holes 21 in the cover 18 is formed integrally with the window 19, rather than being formed independently of the window 19. According to such a configuration, less time and effort is needed for the processing for forming the window 19 and each of the through holes 21 in the cover 18. Whether the configuration in FIG. 5 or 7 is being employed, the film 30 still needs to be of such a size and shape so as to not interfere with the regulating parts 20 when the edges are at least partially nipped between the recess 13 and the cover 18.

The shape of the regulating parts 20 is not limited to being what is illustrated in FIG. 6. For example, the regulating parts 20 may be such that a shape (a shape such as with the engagement surfaces 24a for meshed engagement with the recess 13 side) for making it possible to move while being engaged with the recess 13 side is formed in the surface opposite to any of the side surfaces of the through holes 63 of the recess 13, with movement being concurrent with meshed engagement with this side surface. Alternatively, the regulating parts 20 may be made to be screws that are screwed into screw holes formed in the recess 13, it being possible to adjust the height of the regulating parts 20 by rotating the regulating parts 20 (screws).

Figure 8:
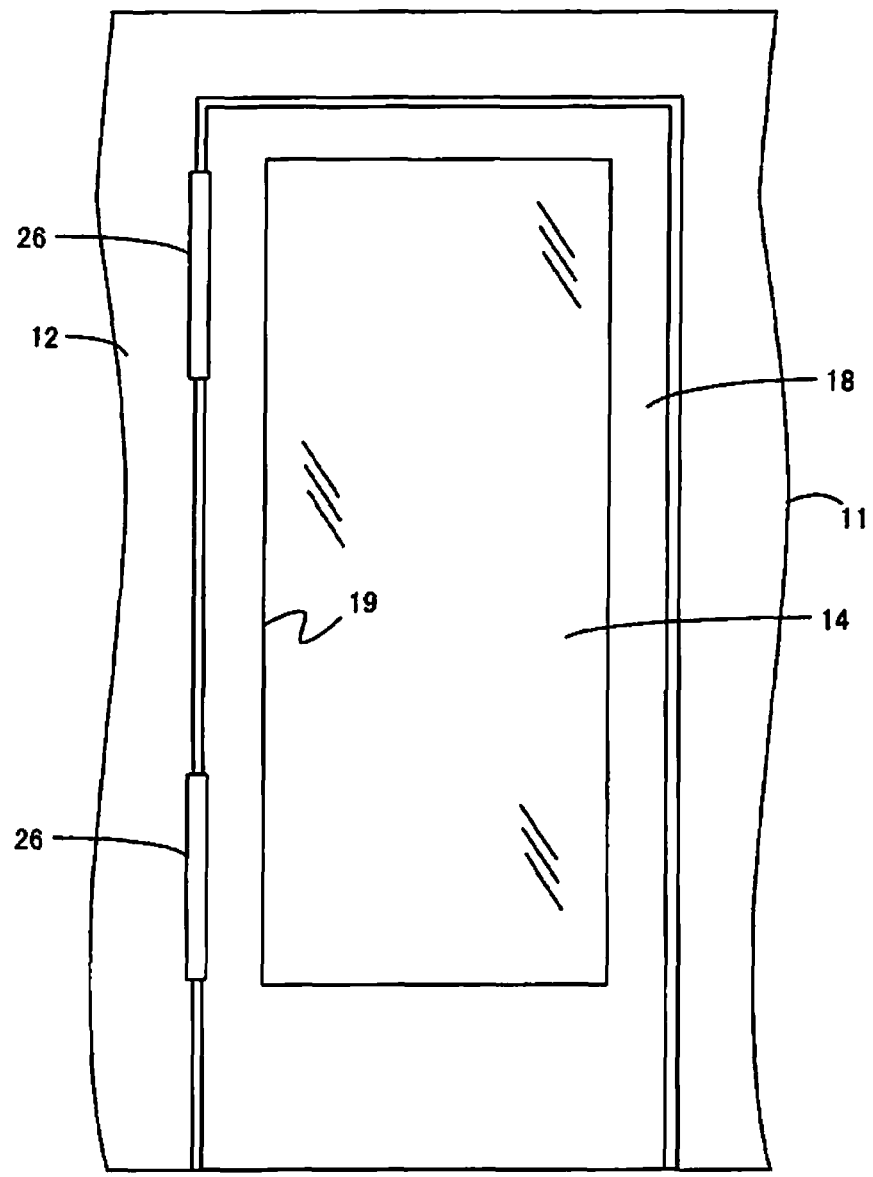
FIG. 8 is a plan view illustrating another example of a cover and one part of a holder main body.

FIG. 8 illustrates the cover 18 and a part of the holder main body 11 with a similar point of view to that of FIGS. 5 and 7, and illustrates an example different from those of FIGS. 5 and 7. FIG. 8 omits any depiction of the regulating parts 20 or the through holes 21. Previously, the configuration where the short side of the cover 18 is coupled by the hinges 25 to the holder main body 11 was described, but the example in FIG. 8 illustrates a configuration where one of the long sides of the cover 18 is coupled by hinges 26 to the holder main body 11. Adopting such a configuration makes it possible for the user to more comfortably open or close the cover 18, because the radius of rotation of the cover 18 is shorter than in the examples in FIGS. 5 and 7.

Also, according to the example in FIG. 8, a film 30 longer than the long sides of the cover 18 can be nipped between the holder main body 11 and the cover 18, because there is no object (the hinges 25) that would interfere with the film 30 in the longitudinal direction of the cover 18. At this time, the state is one where a part of the film 30 juts out beyond the cover 18 in the longitudinal direction of the cover 18. Also, a case where the film 30 longer than the long sides of the cover 18 is being nipped between the holder main body 11 and the cover 18 would necessitate having the orientation of the film holder 10 on the platen 42 (a second orientation), which is orthogonal to the orientation illustrated in FIG. 3 (a first orientation), so that the portion of the film 30 that juts out does not interfere with the portion of coupling between the lid part 45 and the main body part 41 of the scanner 40. To achieve this second orientation, each of the holes into which each of the protrusions 16 (FIG. 1) is inserted when the film holder 10 has been brought to the second orientation may be provided to the platen 42.

Figure 9:
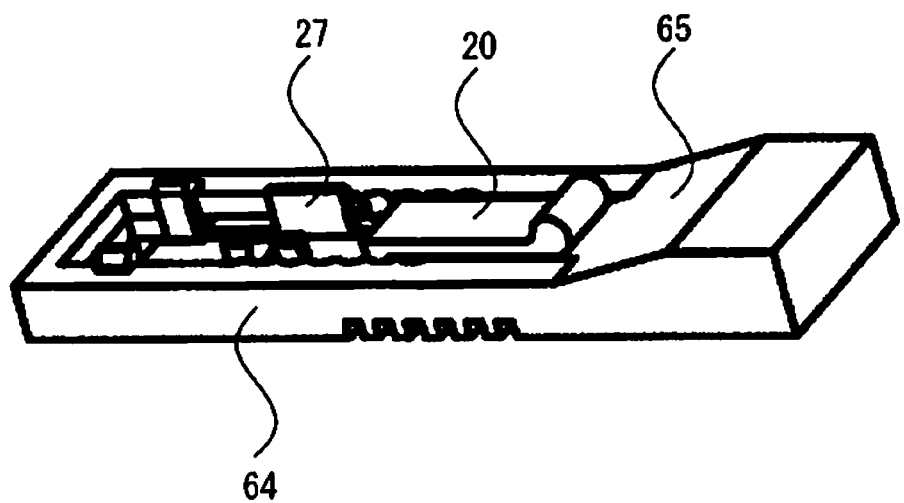
FIG. 9 is a perspective view of a regulating part and the like in another example.
Figure 10A:
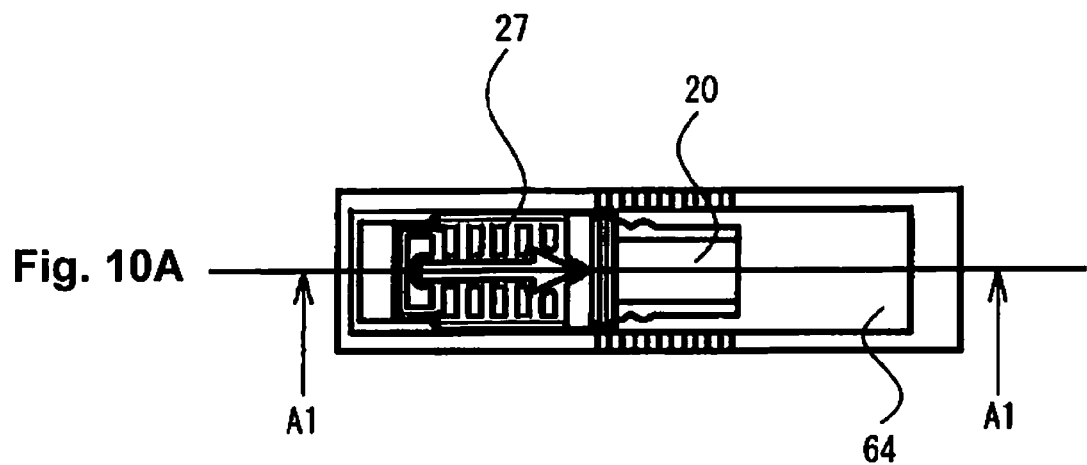
FIG. 10A is a plan view of the regulating part and the like in another example.
Figure 10B:
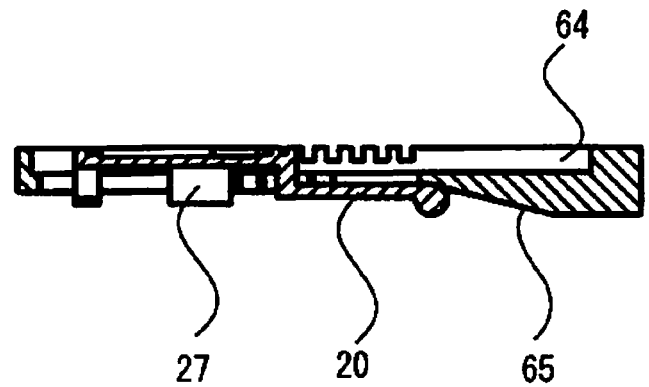
FIG. 10B illustrates a cross-sectional view taken along an A1-A1 line in FIG. 10A.

FIGS. 9, 10A, and 10B illustratively exemplify the regulating parts 20 or the like having a shape different from the shape illustrated in FIG. 6. FIG. 9 is a perspective view illustrating the configuration of the vicinity, comprising the regulating part 20. FIG. 10A is a plan view illustrating the configuration of the vicinity comprising the regulating part 20 illustrated in FIG. 9, by a point of view from the surface 17 side of the holder main body 11, and FIG. 10B illustrates a cross-sectional view taken along the A1-A1 line in FIG. 10A. The configuration illustrated in FIG. 9 is substantially equivalent to a configuration that falls on the inside of the through holes 21 of the cover 18 in the state where the cover 18 has been closed. Any instance referring to "upward" or "upper" in the description of FIGS. 9, 10A, and 10B is referring to the surface 12 of the holder main body 11, and any instance referring to "downward" or "lower" is referring to the surface 17. FIG. 10B is a state where upward is oriented downward and downward is oriented upward (in other words, a state where the film holder 10 has been inverted, as stated above).

In FIGS. 9, 10A, and 10B, the regulating part 20 is formed integrally with a slider 27. The slider 27 is able to move along the direction of the outlined arrow illustrated within FIG. 10A while also being engaged with a fixed part 64. The fixed part 64 is a portion of the recess 13. The fixed part 64 has an inclined surface 65 serving as an upslope for increasing the thickness of the fixed part 64, at a part of the upper surface. The user moves the slider 27 (a part of the regulating parts 20) along the direction of the outlined arrow. In association with this movement, the regulating part 20 rides up the inclined surface 65. The regulating part 20 riding up the inclined surface 65 has a distal end part that protrudes out upward beyond the other portions, and is rounded. The distal end part of the regulating part 20 is positioned higher than the through holes 21 by ascending the inclined surface 65. In other words, the distal end part of the regulating part 20 comes into contact with the platen 42 (platen glass 43) when the film holder 10 is inverted (FIGS. 1C and 10B) and installed onto the platen 42 of the scanner 40. That is to say, similarly with respect to the regulating part 20 illustrated in FIG. 6, moving each of the regulating parts 20 illustrated in FIGS. 9, 10A, and 10B also enables the user to adjust the height (distance) of the holder main body 11 from the platen 42, and so doing enables the user to position the film 30 to a distance that is optimal for the image sensor 48 to have sharpness in reading the film 30.

The numbers and shapes of the protrusions 16 and holes 44 are not limited to what is stated above, and any number or shape can be used provided that the film holder 10 can be positioned. Moreover, there may be a positioning part of another shape, such as there being a hole on the film holder side and a protrusion on the scanner side.

The configuration may be such that the scanner 40 has a print part and prints the image data that has been generated.

A description where the regulating parts 20 are provided to the holder main body 11 has been described, but the regulating parts 20 may be provided to the cover 18. The holder main body 11 is more rigid than the cover 18 usually, so having the regulating parts 20 be provided to the holder main body 11 is able to produce higher precision than having the regulating parts 20 be provided to the cover 18.

The technical concepts of the embodiment may also be implemented by an object or method separate from such a film holder as is described above. One example is a method for reading characterized by comprising a film placement step where a film that has been placed on a holder main body including a transmission part configured to transmit light is nipped between the holder main body and a cover having a window that is arranged on an opposite side of the transmission part, a film holder positioning step where the film holder having the holder main body and the cover is positioned relative to a scanner so that, in the state where the film is nipped between the holder main body and the cover, the transmission part is located on a side of a light source of the scanner, present up above, and the window is located on a side of an imaging unit of the scanner, present down below the light source, and a reading step where the film is irradiated by the light source and the imaging unit reads the film by receiving light that has passed through the film.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A film holder configured to hold a film and adapted to be placed on a scanner having a light source and an imagining unit while the scanner reads the film held by the film holder, the film holder comprising:
   a holder main body including a transmission part that is configured to allow light from the light source to transmit through;
   a cover coupled to the holder main body such that the cover and the holder main body nip the film therebetween, the cover including a window that is arranged on a side opposite to the transmission part relative to the film in a state where the cover and the holder main body nip the film therebetween; and
   a positioning part configured to be positioned relative to the scanner such that the transmission part is located on a side of the light source of the scanner and the window is located on a side of the imaging unit of the scanner, in the state where the holder main body and the cover nip the film.

2. The film holder as set forth in claim 1, further comprising a regulating part configured to come into contact with a platen that accommodates the imaging unit of the scanner and regulate a distance between the platen and the holder main body, the regulating part being arranged in a range where a frame part of a periphery of the transmission part in the holder main body and a frame part of a periphery of the window in the cover overlap with one another.

3. The film holder as set forth in claim 2, wherein
the holder main body further includes the regulating part, and
the cover further includes a through hole configured to allow the regulating part to pass through.

4. The film holder as set forth in claim 3, wherein
the through hole is formed integrally with the window.

5. The film holder as set forth in claim 2, wherein
the regulating part is configured to move relative to the holder main body to keep the distance between the platen and the holder main body to one distance out of different distances.

6. The film holder as set forth in claim 1, wherein
the cover is smaller than the holder main body.

7. A method for generating a read image of a film while the film is scanned using a film holder, the film holder being configured to hold the film and adapted to be placed on a scanner having a light source and an imagining unit while the scanner generates the read image of the film held by the film holder, the film holder including
   a holder main body having a transmission part configured to allow light from the light source to transmit through;
   a cover coupled to the holder main body such that the cover and the holder main body nip the film therebetween, the cover having a window that is arranged on a side opposite to the transmission part relative to the film in a state where the cover and the holder main body nip the film therebetween; and
   a positioning part configured to be positioned relative to a scanner such that the transmission part is located on a side of the light source of the scanner and the window is located on a side of the imaging unit of the scanner, in the state where the holder main body and the cover nip the film,
the method comprising:
placing the film such that the film is nipped between the holder main body and the cover;
positioning the film holder, with which the film is nipped, relative to the scanner, by using the positioning part such that the transmission part is located on the side of the light source of the scanner and the window is located on the side of the imaging unit of the scanner; and
generating the read image by irradiating the film with light using the light source and reading the film by receiving the light that has passed through the film using the imaging unit.

8. A scan system, comprising:
a scanner configured to read a film, the scanner including a light source and an imaging unit; and
a film holder configured to hold the film and be placed on the scanner while the scanner reads the film held by the film holder,
the film holder including
   a holder main body having a transmission part configured to allow light from the light source to transmit through;
   a cover coupled to the holder main body such that the cover and the holder main body nip the film therebetween, the cover having a window that is arranged on a side opposite to the transmission part relative to the film in a state where the cover and the holder main body nip the film therebetween; and
   a positioning part configured to be positioned relative to the scanner such that the transmission part is located on a side of the light source of the scanner and the window is located on a side of the imaging unit of the scanner, in the state where the holder main body and the cover nip the film.

* * * * *